United States Patent [19]
Lee

[11] Patent Number: 6,166,749
[45] Date of Patent: Dec. 26, 2000

[54] OPTICAL SCANNING SYSTEM FOR PRINTER

[75] Inventor: Beom-ro Lee, Seoul, Rep. of Korea

[73] Assignee: SamSung Electronics Co., Ltd., Suwon, Rep. of Korea

[21] Appl. No.: 09/455,519

[22] Filed: Dec. 7, 1999

[30] Foreign Application Priority Data

Dec. 7, 1998 [KR] Rep. of Korea ................. 98-53475

[51] Int. Cl.[7] ................. B41J 2/385; G01D 15/06; G03G 15/01
[52] U.S. Cl. ................. 347/116
[58] Field of Search ................. 347/115, 116, 347/232, 235; 399/162, 299, 301

[56] References Cited

U.S. PATENT DOCUMENTS

| | | |
|---|---|---|
| 5,208,796 | 5/1993 | Wong et al. . |
| 5,302,973 | 4/1994 | Costanza et al. . |
| 5,321,434 | 6/1994 | Strauch et al. . |
| 5,339,150 | 8/1994 | Hubble, III et al. ......... 347/116 X |
| 5,381,165 | 1/1995 | Lofthus et al. . |
| 5,381,167 | 1/1995 | Fujii et al. ............. 347/116 |
| 5,499,092 | 3/1996 | Sasaki . |
| 5,896,472 | 4/1999 | Takayama . |
| 5,982,402 | 11/1999 | Yoshikawa et al. . |

Primary Examiner—Sandra Brase
Attorney, Agent, or Firm—Robert E. Bushnell, Esq.

[57] ABSTRACT

An optical scanning system of a printer, which includes: a plurality of optical scanning units which scan line in parallel onto a circulating photoreceptor belt; a plurality of photodetector for detecting light emitted from each optical scanning unit, to output pulse signals according to the detection; a mark sensor for detecting the pass of a mark formed in the photoreceptor belt at a set position, and for outputting a reference path detection signal according to the detection of the mark; a page synchronization signal generation unit for counting the number of pulse signals output from one selectedphotodetector in synchronism with the reference path detection signal input thereto, and for generating page synchronization signals for each optical scanning unit whenever the count value reaches a page synchronization target value for each optical scanning unit, the page synchronization target values have been set according to a point in time at which each page area set in the photoreceptor belt reaches the scanning position of each optical scanning unit; and an optical scanning control unit for controlling each optical scanning unit to scan image information using the page synchronization signals. The optical scanning system can continuously generate page sync signals until a page area set in the photoreceptor belt passes through the scanning area of each optical scanning unit, using pulse signals output from a selected photodetector, thereby suppressing occurrence of an error in writing image information.

10 Claims, 4 Drawing Sheets

6,166,749

OPTICAL SCANNING SYSTEM FOR PRINTER

CLAIM OF PRIORITY

This application makes reference to, incorporates the same herein, and claims all benefits accruing under 35 U.S.C. §119 arising from an application for a Optical Scanning System For Printer earlier filed in the Korean Industrial Property Office on Dec. 7, 1998 and there duly assigned Serial No. 53475/1998.

1. Field of the Invention

The present invention relates to an optical scanning system, and more particularly, to an optical scanning system for printers, for writing an image in a circulating photoreceptor belt using a plurality of optical scanning units.

2. Description of the Related Art

U.S. Pat. No. 5,499,092 for a Method and a Color Image Forming Apparatus Forming a Positioning Mark to Sasaki disclose the use of a mark, mark sensor, and a photoreceptor belt in the optical scanning operation for synchronizing writing images to sheets of paper. U.S. Pat. No. 5,381,165 for a Raster Output Scanner With Process Direction Registration to Lofthus et al, U.S. Pat. No. 5,208,796 for a Method and Apparatus for Transverse Image Registration on Photoreceptive Belts to Wong et al, U.S. Pat. No. 5,896,472 for an Image Forming Apparatus to Takayama and U.S. Pat. No. 5,982,402 for an Apparattus for Printing Color Image by Combination of Optical Beam Scanning Units and Photosensitive Drums to Yoshikawa et al each disclose image registration systems for printers. What is needed is a page synchronization circuit that operates effeciently so that different colors are not displaced when printed due to a photoreceptor belt occasionally blocking one or many photodetectors.

SUMMARY OF THE INVENTION

An object of the present invention is to provide an optical scanning system for a printer, which can reduce occurrence of an error in generation of page sync signals for adjusting a scanning timing of each optical scanning unit, thereby reducing an error in writing image information.

It is also an object to reduce the rate of image forming error by using the signal generated from the first photo detector rather than using the signal generated from all four photo detectors in an optical scanning system.

To achieve the above object, there is provided an optical scanning system for a printer, comprising: a plurality of optical scanning units which scan line in parallel onto a circulating photoreceptor belt; a plurality of photodetector for detecting light emittedfrom each optical scanning unit, to output pulse signals according to the detection; a mark sensor for detecting the pass of a mark formed in the photoreceptor belt at a set position, and for outputting a reference path detection signal according to the detection of the mark; a page synchronization signal generation unit for counting the number of pulse signals output from one selected photodetector in synchronism with the reference path detection signal input thereto, and for generating page synchronization signals for each optical scanning unit whenever the count value reaches a page synchronization target value for each optical scanning unit, the page synchronization target values have been set according to a point in time at which each page area set in the photoreceptor belt reaches the scanning position of each optical scanning unit; and an optical scanning control unit for controlling each optical scanning unit to scan image information using the page synchronization signals.

Preferably, the page synchronization signal generation unit comprises: a first counter for outputting a page sync signal of the corresponding optical scanning unit when the count value of the pulse signals output from the selected photodetector reaches the corresponding set target value, and downloading the count value and restarting counting pulse signals whenever the reference path detection signal is input; and a second counter for receiving the count value from the first counter when the reference path detection signal is input, for counting the pulse signals from the selected photodetector starting from the received count value, and for generating page synchronization signals of the corresponding optical scanning units when the count value reaches the corresponding target values.

In another embodiment, the page synchronization signal generation unit comprises: a first counter for counting pulse signals from the selected photodetector, and for outputting page synchronization signals of the corresponding optical scanning unit when the count value reaches the corresponding target values; a second counter for counting pulse signals from the selected photodetector, and for outputting page synchronization signals of the corresponding optical scanning unit when the count value reaches the corresponding target values; and a reset selection portion for alternately resetting the first and second counters whenever the reference path detection signal is generated, to allow the first and second counters to restart counting.

BRIEF DESCRIPTION OF THE DRAWINGS

A more complete appreciation of the invention, and many of the attendant advantages thereof, will bereadily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
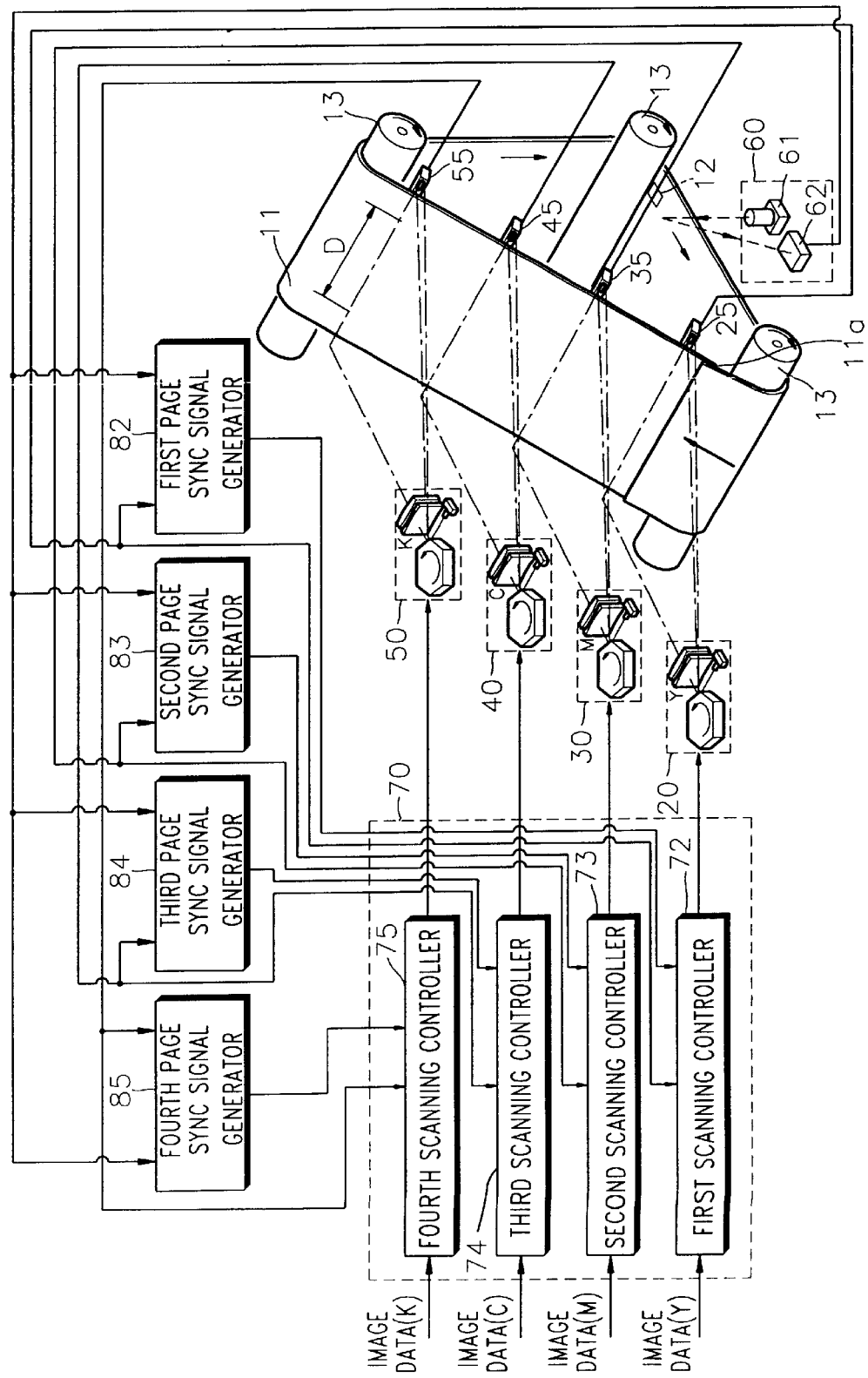
FIG. 1 is a diagram showing a conventional optical scanning system of a printer.

FIG. 1 shows a conventional optical scanning system for a printer. The optical scanning system shown in FIG. 1 comprises a photoreceptor belt 11, optical scanning units 20, 30, 40 and 50, photodetectors 25, 35, 45 and 55, a mark sensor 60, an optical scanning control unit 70, and first through fourth page synchronization (sync) signal generators 82, 83, 84 and 85.

In order to form a desired image on a page area, which is assigned the same size as a print paper on the photoreceptor belt 11 which circulates around a plurality of rollers 13, emission of light for each of the respective color image information must be started in accordance with the point in time when the page area reaches the scanning positions of the optical scanning units 20, 30, 40 and 50 which scan color image information, for example, about colors of yellow (Y), magenta (M), cyan (C) and black (K), respectively.

For the purpose of accurately scanning light onto a desired area, in the conventional optical system shown in FIG. 1, first through fourth scanning controllers 72, 73, 74 and 75, which make up the optical scanning control unit 70, receive page synchronization (sync) signals from first through fourth page sync signal generators 82, 83, 84 and 85, respectively, to determine a starting point of laser scanning onto the corresponding image data by the first through fourth optical scanning units 20, 30, 40 and 50.

The first through fourth page sync signal generators 82, 83, 84 and 85 count pulse signals output from the corresponding photodetectors 25, 35, 45 and 55, respectively, and output page sync signals if the number of count pulses reach a predetermined value. Here, an output signal of the mark sensor 60 having a light source 61 and a photodetector 62, which indicates arrival of a mark 12 formed on the photoreceptor belt 11 at a detect position, is used as a counting start sync signal for each of page sync signal generators 82, 83, 84 and 85. Thus, when the signal from the mark sensor 60, which indicates the arrival of the mark 12 at the detect position, is input to the page sync signal generators 82, 83, 84 and 85, the page sync signal generators 82, 83, 84 and 85 start counting the pulse signals output from the corresponding photodetectors 25, 35, 45 and 55. Also, when the number of count pulses reaches a predetermined reference value corresponding to a time duration until when the leading end of a page area set on the photoreceptor belt 11 reaches the corresponding scanning position, each of the page sync signal generators 82, 83, 84 and 85 outputs a page synchronization signal in sequence.

In the conventional optical scanning system which operates as above, light receiving areas of the photodetectors 25, 25, 45 and 55 may be blocked by the photoreceptor belt 11 when the photoreceptor belt 11 goes off its path, or when a connection portion 11 a of the photoreceptor belt 11 is uneven. As a result, the photodetectors 25, 35, 45 and 55 cannot output pulse signals every cycle of scanning. That is, the pulse signals cannot be generated in a scanning cycle, which are referred to as missing pulse signals, thus delaying generation of the page sync signals. As a result, optical scanning by the optical scanning units 20, 30, 40 and 50 is started after the leading end of the page area set on the photoreceptor belt 11 passes the scanning start position, so that an error occurs in writing image information. Also, when the number of missing pulse signals is different between the photodetectors 25, 35, 45 and 55, such error in writing image information becomes serious.

Also, the page sync signals must be maintained while the page area set on the photoreceptor belt 11 passes the optical scanning position. However, in the conventional optical scanning system, count values of each page sync signal generator 82, 83, 84 and 85 are reset in synchronism with the signal from the mark sensor 60, which indicates arrival of the mark, and the counting operation of the page sync signal generators 82, 83, 84 and 85 are simultaneously restarted. As a result, some page sync signals from the fourth page synchronization signal generator 85 can be missed because the count pulse value may be reset before the page area set on the photoreceptor belt 11 passes through the scanning position of the fourth optical scanning unit 50. The problem can be avoided by making the interval between the optical scanning units 20, 30, 40 and 50 narrow. However, developer units for supplying corresponding color developer, and an electric charging unit which allows to write new electrostatic latent image in the photoreceptor belt 11, are arranged between the optical scanning units 20, 30, 40 and 50, so that there is a limitation in reducing the interval between each optical scanning unit.

Figure 2:
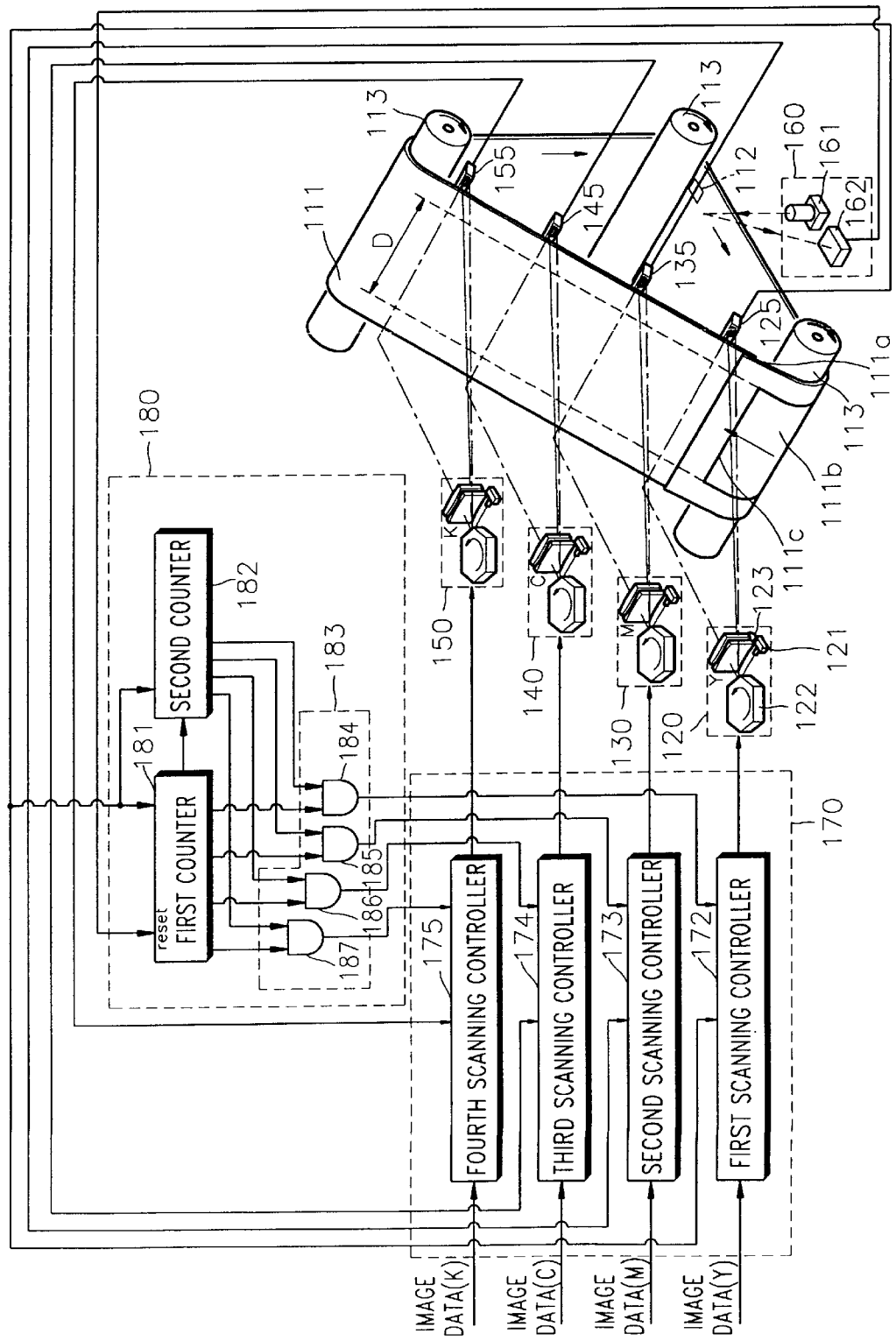
FIG. 2 is a diagram showing an optical scanning system of a printer according to a preferred embodiment, of the present invention.

In FIG. 2, an optical scanning system of a printer according to the present invention comprises optical scanning units 120, 130, 140 and 150, photodetectors 125, 135, 145 and 155, a mark sensor 160, an optical scanning control unit 170, a page synchronization (sync) signal generation unit 180. The optical scanning units 120, 130, 140 and 150 scan light onto a photoreceptor belt 111 which circulates around a plurality of rollers 113.

Each optical scanning unit 120, 130, 140 and 150 is constructed of the same elements. The first optical scanning unit 120 for scanning yellow (Y) color information comprises a light source 121 for emitting light, a rotary optical polygon 122 which rotates at a constant speed, a lens unit 123 for condensing light deflected by the rotary optical polygon 122 onto the photoreceptor belt 111. A cycle of line scanning, which is the time duration required for one line scanning, of the first optical scanning unit 120 is determined by the rotary speed of the rotary optical polygon 122. Although not shown in FIG. 2, each optical scanning units 120, 130, 140 and 150 may include a light source and a scan disc having a diffraction pattern, which deflects an incident light beam at a predetermined angle with the rotation of the scan disc.

The photodetectors 125, 135, 145 and 155 installed behind the photoreceptor belt 111 receive incident lights and output corresponding pulse signals. Each photodetector 125, 135, 145 and 155 are arranged to be capable of receiving light emitted from the corresponding optical scanning unit toward each light receiving region which ranges from a predetermined position off the edge of the photoreceptor belt 111 until the light reaches the edge of the photoreceptor belt 111. Thus, if the photoreceptor belt 11 does not obscure the light receiving regions of each photodetector, the photodetectors 125, 135, 145 and 155 can output pulse signals every cycle of line scanning of the corresponding optical scanning units 120, 130, 140 and 150. One of the photodetectors 125, 135, 145 and 155 is selected as a source of a signal to be input to the page sync signal generation unit 180.

Preferably, the output signal of a photodetector capable of receiving light emitted from an optical scanning unit which can write a color image data in the same page in advance of other optical scanning units, is input to the page sync signal generation unit 180. That is, the output signal of the photodetector 125 capable of receiving the light emitted from the first optical scanning unit 120 which takes the head in scanning positions with respect to the traveling direction of the photoreceptor belt 111, is input to the page sync signal generation unit 180.

The mark 112 formed on the photoreceptor belt 111 is used to check the path of the photoreceptor belt 111. Whenever the photoreceptor belt 111 circulates once, the mark sensor 160 having a light source 161 and a photodetector 162 outputs a reference path detection signal in response to the detection of the mark 112. Preferably, the mark 112 and a connection portion 111a of the photoreceptor belt 111 are located such that the connection portion 111a of the photoreceptor belt 111, which may obscure the photodetectors 125, 135, 145 and 155, is positioned near the scanning position of the first optical scanning unit 120 coupled to the first photodetector 125 which is selected to provide its pulse signal to the page sync signal generation unit 180, as soon as the reference path detection signal is generated.

The page sync signal generation unit 180 comprises a first counter 181, a second counter 182 and a signal mixing portion 183. Both the first and second counters 181 and 182 receive the output signal of the first photodetector 125. The reference path detection signal from the mark sensor 160, which indicates arrival of the mark 112, is used as a reset signal for synchronizing the start of counting in the first counter 181. Whenever the reference path detection signal is input, the first counter 181 starts counting pulse signals from the first photodetector 125, and outputs page sync signals to the corresponding optical scanning unit 120, 130, 140 and 150 when the count value reaches a predetermined target page sync value.

Also, the leading end 111c of the page area 111b of the photoreceptor belt 111 first reaches the scanning position of the first optical scanning unit 120. Then, the leading end 111c of the page area 111b reaches the scanning positions of the second through fourth optical scanning units 130, 140 and 150 in sequence with a predetermined interval. Thus, a page sync target value corresponding to a time duration for which the page area 111b of the photoreceptor belt 111 passes each scanning position of the optical scanning units 120, 130, 140 and 150, is greater in the fourth optical scanning unit 150 than in the first optical scanning unit 120. Thus, some of the page sync target values may exceed a maximum count value which is obtained by counting the pulse signals until the first counter 181 is reset by the reference path detection signal.

The second counter 182 is for the page sync target values which are over the maximum count value of the first counter. The second counter 182 receives the count value of the first counter 181 whenever the reference path detection signal is output. Also, the second counter 182 counts the pulses received from the first photodetector 125 starting from the count value received from the first counter 181 until the following reference path detection signal is received, and outputs the page sync signals of the corresponding optical scanning units 120, 130, 140 and 150 when the count value reaches set target values.

The signal mixing portion 183 outputs the page sync signals received from the first and second counters 181 and 182 to the corresponding scanning controllers of the optical scanning control unit 170. In an example of the signal mixing portion 183 shown in FIG. 2, the page sync signals output from the counters 181 and 182 are active at a low level. Each AND gate 184, 185, 186, 187 output the page sync signals to the corresponding first through fourth scanning controller 172, 173, 174 and 175, whenever the first and/or second counters 181 and 182 output a low page sync signal. However, a signal mixing portion capable of outputting a page sync signal, which is active at a high level, can be designed by replacing the AND gates of the signal mixing portion 183 with OR gates.

Figure 3:
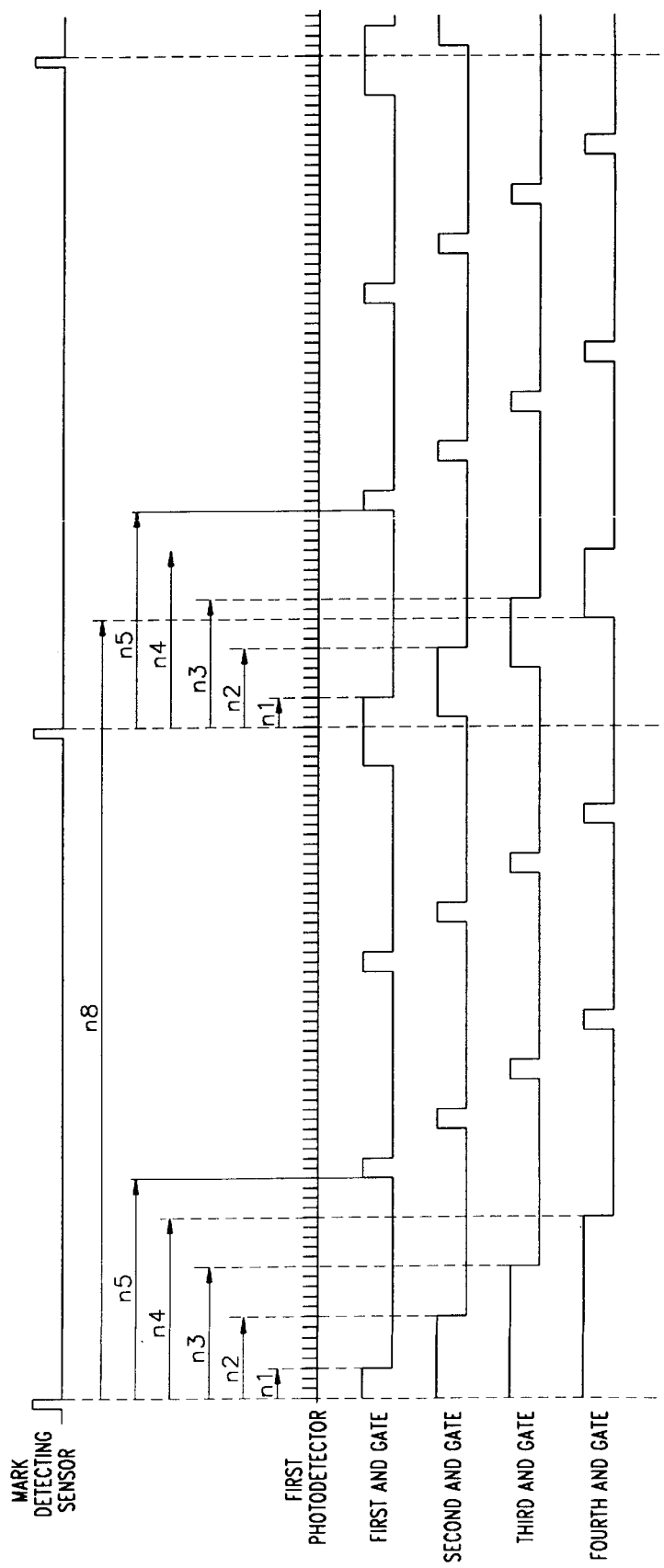
FIG. 3 is a timing diagram of signals output from a part of the optical scanning system in FIG. 2.

The signal process in the page sync signal generation unit 180 will be described in greater detail with reference to FIG. 3. FIG. 3 shows waveforms of output signals in the case where the photoreceptor belt 111 is as long as for 3 sheets of paper, for example, having a size of 210×297 mm (A4), to be arranged around the photosensitive belt 111. When a reference path detection signal from the mark sensor 160 is input to the first counter 181, the first counter 181 is reset and simultaneously counts the pulse signals received from the first photodetector 125. When the count value reaches a starting target value n1 which corresponds to a point in time at which the leading end 111c of the first page area 111b of the photoreceptor belt 111 reaches the scanning position of the first optical scanning unit 120, the first counter 181 outputs a signal of a low level to the first AND gate 184. The output of the low level signal to the first AND gate 184 is continued until the count value reaches an end target value n5 which is set corresponding to the period until the first page area 111b passes through the scanning area of the first optical scanning unit 120. Also, when the low page sync signal of the first page area 111b which corresponds to the first optical scanning unit 120 is output, and the count value reaches a starting target value n2, which is set corresponding to a point in time at which the leading end 111c of the first page area 111b reaches the scanning position of the second optical scanning unit 130, the first counter 181 outputs a low level signal to the second AND gate 185. In a similar manner, when the count value reaches a starting target value n3, which is set corresponding to a point in time at which the leading end 111c of the first page area 111b reaches the scanning position of the third optical scanning unit 140, and a starting target value n4, which is set corresponding to a point in time at which the leading end 111c of the first page area 111b reaches the scanning position of the fourth optical scanning unit 150, the first counter 181 outputs a low level signal to the third AND gate 186 and the fourth AND gate 187, respectively.

Also, when the count value reaches a starting target value corresponding to a point in time at which the following second page area reaches the scanning position of the first optical scanning unit 120, the first counter 181 outputs a low page sync signal of the second page area which corresponds to the first optical scanning unit 120. In the first counter 181, the starting target values are set for initiating scanning of the first through fourth optical scanning units 120, 130, 140 and 150 onto the first, second and third page areas, and end target values for the first through fourth optical scanning units 120, 130, 140 and 150, which are indicative of termination of scanning onto the first through second page areas. Only for the first optical scanning unit 120, an end target value for terminating scanning onto the third page area is also set in the first counter 181.

Also, end target values, which are indicative of that the third page areas pass through the second through fourth optical scanning units 130, 140 and 150, are greater than the number of pulse signals output from the first photodetector 125 during which the reference path detection signal is generated. Thus, these end target values are set in the second counter 182. One of the end target values set in the second counter 182, which is shown in FIG. 3, is an end target value n8 which corresponds to the period when the third page area passes through the scanning position of the fourth optical scanning unit 150.

When the following reference path detection signal is received from the mark sensor 160, the first counter 181 outputs the count value and restarts counting in the same manner as mentioned above. The second counter 182 adds the number of pulse signals output from the first photodetector 125 to the count value from the first counter 181, which is output immediately before the first counter 181 is reset, and transits the logic level of the low page sync signal when the corresponding count values reach the end target values indicating the termination of scanning onto the page areas by the second, third and fourth optical scanning units 130, 140 and 150.

In the above embodiment, the page area is assigned on the photoreceptor belt 11 such that the first optical scanning unit 120 can write image information to all three page areas while the photoreceptor belt 11 circulates one time. In this case, the signal mixing portion 183 can be designed without the first AND gate 184, such that the first counter 111 can output a page sync signal directly to the first scanning controller 172.

The optical scanning control unit 170 comprises first through fourth scanning controllers 172, 173, 174 and 175 for receiving image data in different colors. Each of the first through fourth scanning controllers 172, 173, 174 and 175 control the light emission of the first through fourth optical scanning units 120, 130, 140 and 150 by receiving the page sync signals from the page sync signal generator unit 180 and the signals from the first through fourth photodetectors 125, 135, 145 and 155. The signals from the first through fourth photodetectors 125, 135, 145 and 155 are used to synchronize line scanning.

In the operation of the optical scanning system according to the present invention, the first through fourth optical scanning units 120, 130, 140 and 150 are controlled by the first through fourth scanning controllers 172, 173, 174 and 175, respectively, to emit light onto the corresponding first through fourth photodetectors 125, 135, 145 and 155 every line scanning period which is a time duration required for one line scanning. When the reference path detection signal, which is indicative of the arrival of the mark 112, is received from the mark sensor 160, the first counter 181 starts counting the number of pulses from the first photodetector 125. Also, the second counter 182 counts the pulses from the first photodetector 125 starting from the count value received from the first counter 181. The first and second counters 181 and 182 generates the corresponding page sync signals when each count value reach predetermined target values set therein.

When the page sync signals are provided to the first through fourth scanning controllers 172, 173, 174 and 175, each of the first through fourth scanning controllers 172, 173, 174 and 175 controls the optical scanning units 120, 130, 140 and 150, respectively, while synchronizing the timing of line scanning using pulse signals output from the corresponding first through fourth photodetectors 125, 135, 145 and 155, such that the first and fourth optical scanning units 120, 130, 140 and 150 emit optical signals each corresponding to one page of image information in different colors. In detail, when a page sync signal is input to the first scanning controller 172 and then a pulse indicating termination of light reception by the first photodetector 125 is input thereto, the first scanning controller 172 determines that the light emitted from the light source 121 reaches the edge of the photoreceptor belt 11. Then, the first scanning controller 172 controls the light source 121 of the first optical scanning unit 120 such that it emits light corresponding to yellow image information in the first line of the page after a predetermined time goes by, which corresponds to a time duration required for scanning light from the edge to a write information writing area D of the photoreceptor belt 111. Then, when the next pulse is input from the first photodetector 125, the first scanning controller 172 controls the light source 121 of the first optical scanning unit 120 in the same manner as above, to emit light corresponding to yellow image information in the second line of the same page. This process is continued until a page sync signal is no longer provided to the first scanning controller 171. Also, the operation of the second, third and fourth optical scanning units 130, 140 and 150 is controlled by the corresponding scamming controllers in the same manner as above.

Electrostatic latent image, which is formed on the photoreceptor belt 111 through light scanning by the first through fourth optical scanning units 120, 130, 140 and 150, is developed by developer units (not shown) which are located between the first and fourth optical scanning units 120, 130, 140 and 150, and supply developers for the respective colors.

Figure 4:
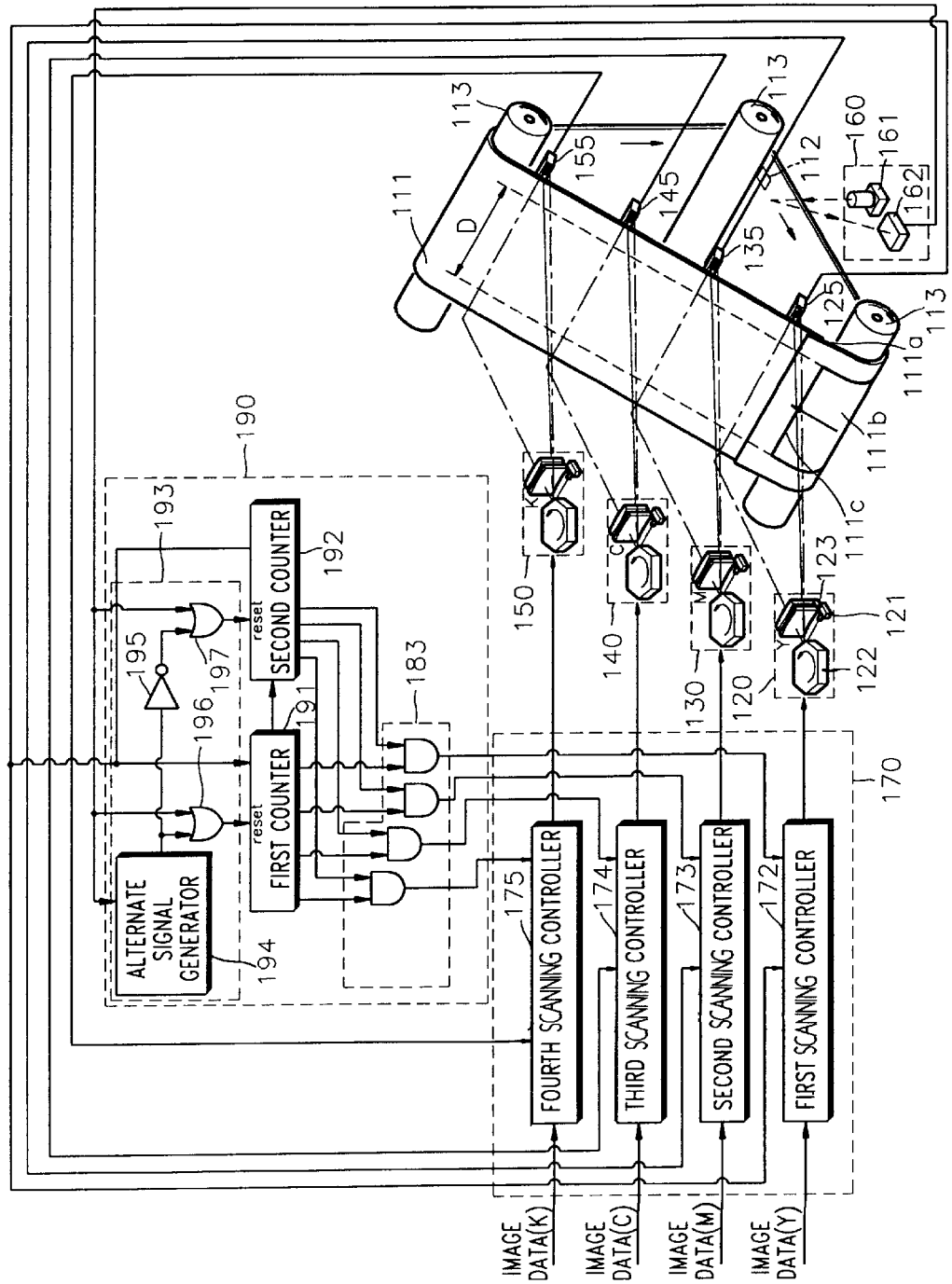
FIG. 4 is a diagram showing an optical scanning system of a printer according to another embodiment of the present invention.

FIG. 4 is a diagram illustrating an optical scanning system of a printer according to another embodiment of the present invention. The same reference numerals as in FIG. 3 represents the same elements. A page sync signal generation unit 190 for generating page sync signals is different from that of FIG. 3. The page sync signal generation unit 190 comprises a first counter 101, a second counter 192, a signal mixing portion 183, and a reset selection portion 193.

The first counter 191 and the second counter 192 receive and count pulse signals from the first photodetector 125, and output page sync signals for the corresponding optical scanning units 120, 130, 140 and 150 when each count value reach predetermined target values. The first and second counters 191 and 192 are controlled by the reset selection portion 193, such that they are alternately reset and restart counting whenever the reference path detection signal is received from the mark sensor 160. Accordingly, both the first and second counters 191 and 192 can count pulses whose number corresponds to twice turns of the photoreceptor belt 111. Also, each count value of the first and second counters 191 and 192 keeps a difference corresponding to as many number of pulses generated during a circulation of the photoreceptor belt 111. In the first and second counters 191 and 192, page sync target values are set with respect to each of a plurality of page areas to be assigned in the photoreceptor belt 111.

The reset selection portion 193 is designed to alternately reset the first and second counters 191 and 192 every when a reference path detection signal is generated. For example, the reset selection portion shown in FIG. 4 comprises an alternate signal generator 194, an inverter 195 and two OR gates 196 and 197. Here, the reset selection portion 193 receives a reference path detection signal having a low level from the mark sensor 160, and outputs reset signals having a low level to the first and second counters 191 and 192.

The alternate signal generator 194 is designed to alternately output a low signal and a high signal upon the reception of the reference path detection signal. Thus, when a low reference path detection signal is input and the alternate signal generator 194 outputs a high signal, only the second counter 192 is reset. Then, when the following reference path detection signal is input, the alternate signal generator 194 outputs a low signal, to reset only the first counter 191. The reset selection portion 193 can be designed properly according to whether the levels of the reference path detection signal and reset signals adopted are high or low.

Accordingly, the first and second counters 191 and 192 can output page sync signals whenever each count value reaches predetermined target values without missing any page sync signal, with an interval corresponding to the number of pulses which can be generated during one circulation of the photoreceptor belt 111. The page sync signals output from the first and second counters 191 and 192 are output through the signal mixing portion 183 to each of the first through fourth scanning controllers 182, 173, 174 and 175.

As described above, the optical scanning system of a printer according to the present invention can continuously generate page sync signals until a page area set in the photoreceptor belt passes through the scanning portion of each optical scanning unit, using pulse signals output from a selected photodetector, thereby suppressing occurrence of an error in writing image information.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical scanning system for a printer, comprising:
   a plurality of optical scanning units which scan lines in parallel onto a circulating photoreceptor belt;
   a plurality of photodetector for detecting light emitted from each optical scanning unit, to output pulse signals according to the detection;
   a mark sensor for detecting the pass of a mark formed in the photoreceptor belt at a set position, and for outputting a reference path detection signal according to the detection of the mark;
   a page synchronization signal generation unit for counting the number of pulse signals output from one selected photodetector in synchronism with the reference path detection signal input thereto, and for generating page synchronization signals for each optical scanning unit whenever the count value reaches a page synchronization target value for each optical scanning unit, the page synchronization target values have been set according to a point in time at which each page area set in the photoreceptor belt reaches the scanning position of each optical scanning unit; and
   an optical scanning control unit for controlling each optical scanning unit to scan image information using the page synchronization signals.

2. The optical scanning system of claim 1, wherein the page synchronization signal generation unit comprises:
   a first counter for outputting a page sync signal of the corresponding optical scanning unit when the count value of the pulse signals output from the selected photodetector reaches the corresponding set target value, and downloading the count value and restarting counting pulse signals whenever the reference path detection signal is input; and
   a second counter for receiving the count value from the first counter when the reference path detection signal is input, for counting the pulse signals from the selected-photodetector starting from the received count value, and for generating page synchronization signals of the corresponding optical scanning units when the count value reaches the corresponding target values.

3. The optical scanning system of claim 2, said page synchronization signal generation unit further comprising a signal mixing portion mixing outputs from said first counter and said second counter and outputs page sync signals.

4. The optical scanning system of claim 3, said signal mixing portion comprising a plurality of AND gates.

5. The optical scanning system of claim 3, said signal mixing portion comprising a plurality of OR gates.

6. The optical scanning system of claim 1, wherein the page synchronization signal generation unit comprises:
   a first counter for counting pulse signals from the selected photodetector, and for outputting page synchronization signals of the corresponding optical scanning unit when the count value reaches the corresponding target values;
   a second counter for counting pulse signals from the selected photodetector, and for outputting page synchronization signals of the corresponding optical scanning unit when the count value reaches the corresponding target values; and
   a reset selection portion for alternately resetting the first and second counters whenever the to reference path detection signal is generated, to allow the first and second counters to restart counting.

7. The optical scanning system of claim 6, said page synchronization signal generation unit further comprising a signal mixing portion mixing outputs from said first counter and said second counter and outputs page sync signals.

8. The optical scanning system of claim 7, said signal mixing portion comprising a plurality of AND gates.

9. The optical scanning system of claim 7, said signal mixing portion comprising aplurality of OR gates.

10. The optical scanning system of claim 1, wherein an output signal of a photodetector, which receives light emitted from the optical scanning unit corresponding to a page sync signal which is generated in advance since the generation of the reference path detection signal, is input to the page synchronization signal generation unit.

* * * * *